(12) United States Patent
Ci

(10) Patent No.: US 11,315,562 B2
(45) Date of Patent: Apr. 26, 2022

(54) METHOD AND DEVICE FOR INFORMATION INTERACTION

(71) Applicant: Zhonghua Ci, Beijing (CN)

(72) Inventor: Zhonghua Ci, Beijing (CN)

( * ) Notice: Subject to any disclaimer, the term of this patent is extended or adjusted under 35 U.S.C. 154(b) by 280 days.

(21) Appl. No.: 16/661,723

(22) Filed: Oct. 23, 2019

(65) Prior Publication Data
US 2020/0126552 A1    Apr. 23, 2020

(30) Foreign Application Priority Data

Oct. 23, 2018    (CN) .......................... 201811240621.1

(51) Int. Cl.
| | | |
|---|---|---|
| *G10L 15/22* | (2006.01) | |
| *G06F 3/16* | (2006.01) | |
| *G10L 15/08* | (2006.01) | |
| *G10L 25/48* | (2013.01) | |

(52) U.S. Cl.
CPC .............. *G10L 15/22* (2013.01); *G06F 3/167* (2013.01); *G10L 15/08* (2013.01); *G10L 25/48* (2013.01); *G10L 2015/088* (2013.01)

(58) Field of Classification Search
CPC ......... G10L 15/22; G10L 15/00; G10L 15/02; G10L 15/06; G10L 15/063; G10L 15/08; G10L 15/20; G10L 15/26; G10L 2015/022; G10L 2015/027; G10L 2015/0631–0638; G10L 2015/088; G10L 2015/221–228
USPC ....... 704/231, 235, 243, 246, 251, 255, 270, 704/276

See application file for complete search history.

(56) References Cited

U.S. PATENT DOCUMENTS

| 6,356,785 B1 * | 3/2002 | Snyder | ............... A61N 1/39044 607/5 |
|---|---|---|---|
| 7,076,429 B2 * | 7/2006 | Basson | ................... G10L 21/06 704/270 |
| 2019/0362709 A1 * | 11/2019 | Agrawal | ................. G10L 15/22 |

FOREIGN PATENT DOCUMENTS

| CN | 1584980 A | 2/2005 |
|---|---|---|
| CN | 102342858 A | 2/2012 |
| CN | 204375414 U | 6/2015 |
| CN | 108257604 A | 7/2018 |
| CN | 108287815 A | 7/2018 |

* cited by examiner

*Primary Examiner* — Qi Han
(74) *Attorney, Agent, or Firm* — Cantor Colburn LLP

(57) ABSTRACT

The main object of the present application is to provide a method and device for information interaction by quantitatively inputting voice indicators and processing and interacting information, the method comprising: displaying and persistently flashing a first prompt word and starting to receive a first input voice of a user; comparing the first input voice with the first prompt word; displaying and persistently flashing a second prompt word and starting to receive a second input voice of the user; comparing the second input voice with the second prompt word; and if the second input voice is matched with the second prompt word, then integrating the first input voice and the second input voice to be a digital voice file, and storing the digital voice file. The present application can help the user correctly, quickly and simply record sound, and reduce interference factors to the least, and can accurately, completely and conveniently acquire user sound, thus facilitating subsequent analysis and recognition.

9 Claims, 2 Drawing Sheets

METHOD AND DEVICE FOR INFORMATION INTERACTION

TECHNICAL FIELD

The present application relates to the field of audio processing, in particular to a method and device for voice information processing and interaction.

BACKGROUND ART

As everyone knows, the five internal organs (spleen, lung, liver, heart and kidney) of a human body respectively correspond to the five pitches (Gong, Shang, Jue, Zhi and Yu (respectively equivalent to do, re, mi, sol and la)) in classical music. Each one of the five pitches is subdivided into five tones, forming 25 musical scales corresponding to the healthy states of 25 viscera and meridians. "Five Zang-organs harmonize pitch", as a basis for judging the state of a meridian, can prompt what kind of meridian and dietary conditioning should be performed to finally achieve the purpose of "preventive treatment of diseases".

Before determining which one of "the five pitches" human sound belongs to, how to process a voice inputted by a user and how to interact information after the voice is acquired are the problems urgent to be solved in the art.

The information disclosed in the background art part of the present application is only intended to deepen the understanding to the common background art of the present application, but shall not be deemed to admit or imply in any form that the information forms commonly known prior art for a person skilled in the art.

SUMMARY OF THE INVENTION

The main object of the present application is to provide a method for information interaction to reduce the affect of individual differences by quantitatively inputting voice indicators and processing and interacting information.

In order to solve the above-described problems, the present application relates to a method for information interaction, comprising: displaying and persistently flashing a first prompt word and starting to receive a first input voice of a user; after the first input voice of the user is received, comparing the first input voice with the first prompt word; if the first input voice is matched with the first prompt word, then storing the first input voice, displaying and persistently flashing a second prompt word and starting to receive a second input voice of the user; after the second input voice of the user is received, comparing the second input voice with the second prompt word; and if the second input voice is matched with the second prompt word, then integrating the first input voice and the second input voice to be a digital voice file, and storing the digital voice file.

Further, if the first input voice is not matched with the first prompt word, then the method continues to display and persistently flash the first prompt word and starts to receive the first input voice of the user; and if the second input voice is not matched with the second prompt word, then the method continues to display and persistently flash the second prompt word and starts to receive the second input voice of the user.

Further, before the step of integrating the first input voice and the second input voice to be a digital voice file, the method further comprises:
displaying and persistently flashing a third prompt word and starting to receive a third input voice of the user; after the third input voice of the user is received, comparing the third input voice with the third prompt word; if the third input voice is matched with the third prompt word, then displaying and persistently flashing a fourth prompt word and starting to receive a fourth input voice of the user; after the fourth input voice of the user is received, comparing the fourth input voice with the fourth prompt word; if the fourth input voice is matched with the fourth prompt word, then displaying and persistently flashing a fifth prompt word and starting to receive a fifth input voice of the user; after the fifth input voice of the user is received, comparing the fifth input voice with the fifth prompt word; and if the fifth input voice is matched with the fifth prompt word, then integrating the first input voice, the second input voice, the third input voice, the fourth input voice and the fifth input voice to be a digital voice file, and storing the digital voice file.

Further, when each prompt word is displayed, a pinyin corresponding to the prompt word is also displayed below the prompt word.

Further, before the step of displaying a first prompt word and starting to receive a first input voice of a user, the method further comprises: displaying a prompt word list, wherein the prompt word list comprises the characters corresponding to the first to fifth prompt words.

Further, after one input voice is determined to be matched with one prompt word, the character corresponding to the prompt word is highlighted in the prompt word list.

Further, the first prompt word is "do"; the second prompt word is "re"; the third prompt word is "mi"; the fourth prompt word is "sol"; and the fifth prompt word is "la".

In addition, the present application further relates to a method for information interaction, comprising: sequentially displaying and persistently flashing first to fifth prompt words and starting to receive first to fifth input voices of a user; after the first to fifth input voices of the user are received, respectively comparing the first to fifth input voices with the first to fifth prompt words; if the first to fifth input voices are matched with the first to fifth prompt words, then storing the input voices matched with the prompt words; and integrating the input voices matched with the prompt words to be a digital voice file, and uploading the digital voice file.

In addition, the present application further relates to a device for information interaction, comprising: a display module, for sequentially displaying and persistently flashing first to fifth prompt words and starting to receive first to fifth input voices of a user; a comparison module, for respectively comparing the first to fifth input voices with the first to fifth prompt words after the first to fifth input voices of the user are received; a storage module, for storing the input voices matched with the prompt words if the first to fifth input voices are matched with the first to fifth prompt words; and an information processing module, for integrating the input voices matched with the prompt words to be a digital voice file, and uploading the digital voice file.

In addition, the present application further relates to a mobile device, comprising a memory, a processor and a program stored in the memory and capable of running on the processor, wherein when the process executes the program, the steps of the method for information interaction as described above can be realized.

The beneficial effects of the present application are: in the method for information interaction of the present application, a specific interaction mode is adopted in the process that the user records a voice: the prompt word would change according to the currently recorded content, for example, the prompt word can flash, and would jump to the next prompt word after the current word is recorded, thus facilitating subsequent comparison operation; the above-described operations can help the user correctly, quickly and simply record sound, can reduce interference factors to the least, and can accurately, completely and conveniently acquire user sound, thus facilitating subsequent analysis and recognition.

BRIEF DESCRIPTION OF THE DRAWINGS

The drawings forming a part of the present application provide a further understanding to the present application, enabling the other features, objects and advantages of the present application to be more obvious. The exemplary embodiments of the present application, the drawings and the descriptions thereof are used to explain the present application, but are not intended to unduly limit the present application. In the drawings.

DETAILED DESCRIPTION OF THE EMBODIMENTS

To enable a person skilled in the art to better understand the solution of the present application, the technical solutions in the embodiments of the present application will be clearly and completely described hereafter in combination with the drawings in the embodiments of the present application. It is apparent that the described embodiments are only a part of the embodiments of the present application, but not the whole. On the basis of the embodiments of the present application, all the other embodiments obtained by a person skilled in the art without involving an inventive effort should be all concluded in the protection scope of the present application.

In addition, the terms "install", "dispose", "be provided with", "connected", "be configured to" should be understood in a broad sense. For example, the term "connected" can be fixedly connected, detachably connected, or integrally constructed, can be mechanically connected, or electrically connected, and can also be directly connected, or indirectly connected via an intermediate medium, or internally communicated between two devices, elements or components. A person skilled in the art may understand the specific meanings of the above-described terms in the present application according to specific circumstances.

Figure 1:
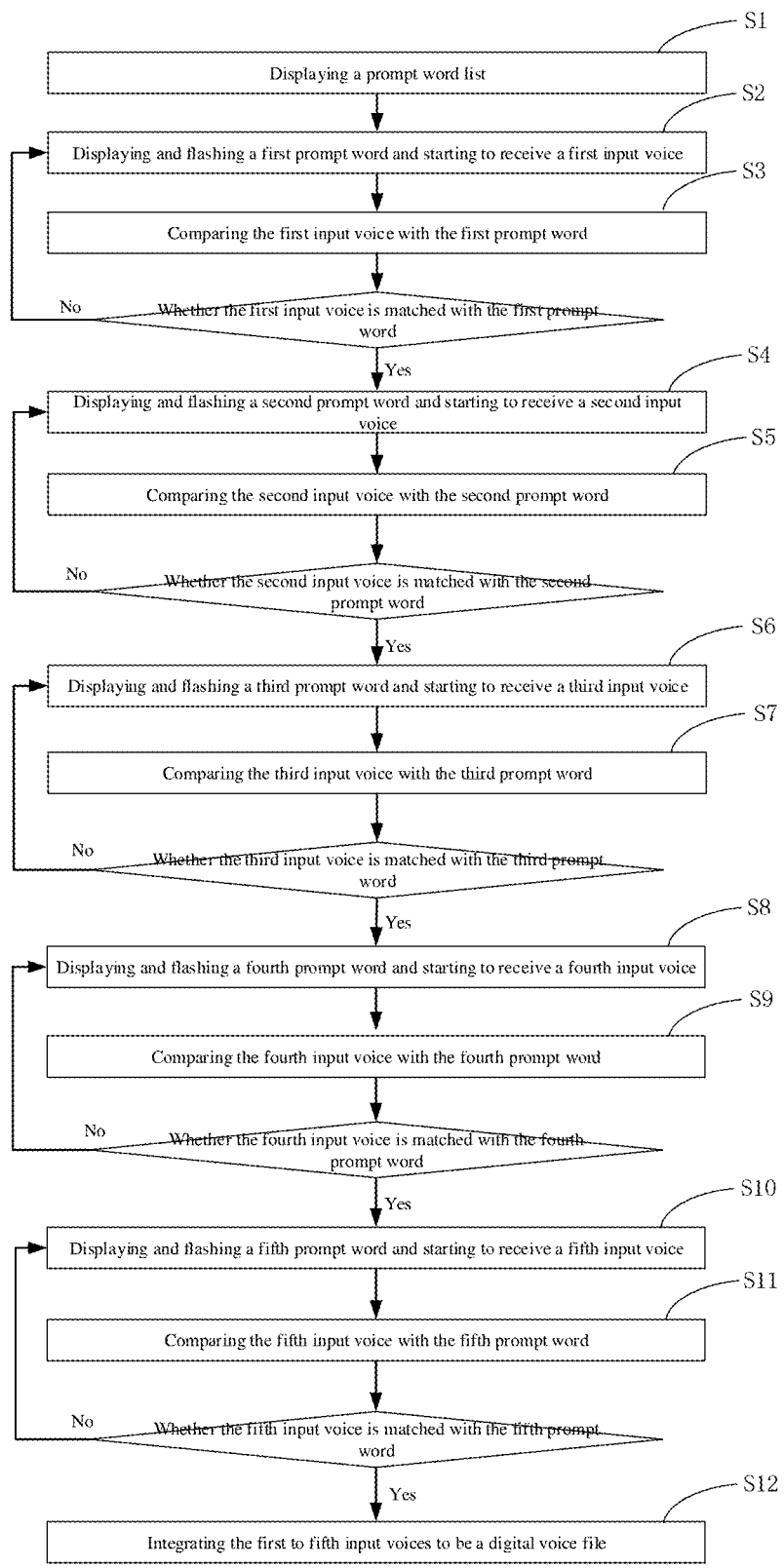
FIG. 1 is a flow chart of the method for voice acquisition according to a first embodiment of the present application.
Figure 2:
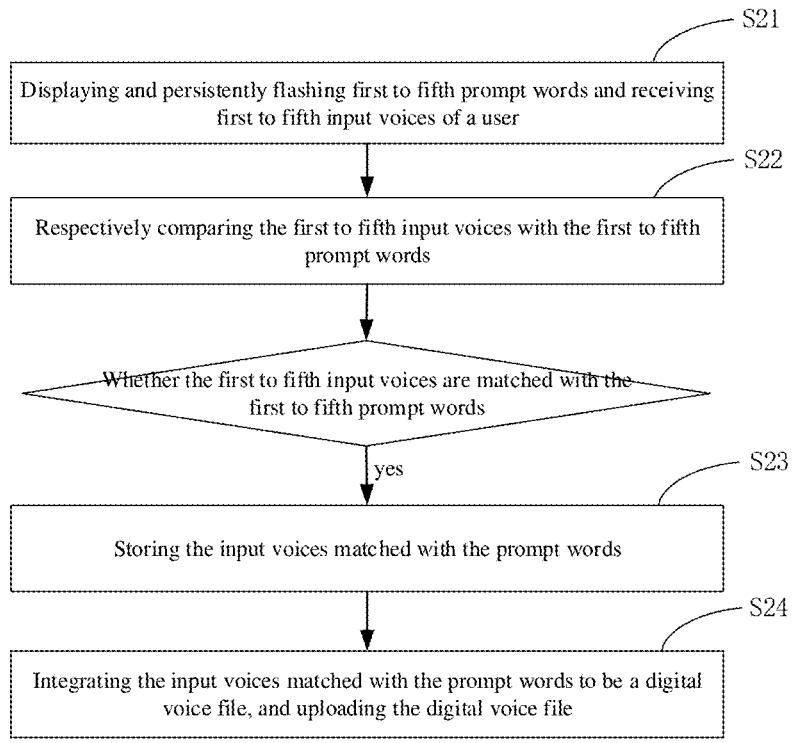
FIG. 2 is a flow chart of the method for voice acquisition according to a second embodiment of the present application.
Figure 3:
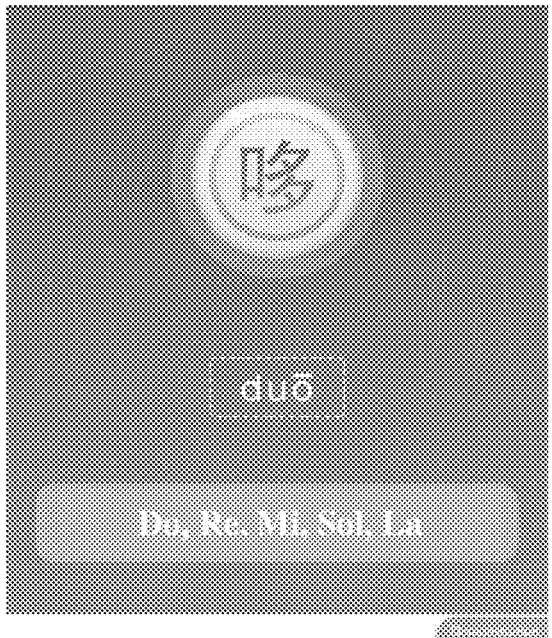
FIG. 3 is a schematic view of a software interface according to one embodiment of the present application.

It should be noted that, in the case of no conflicts, the embodiments in the present application and the features in the embodiments can be mutually combined. The present application will be elaborated hereafter with reference to the drawings and in combination with the embodiments, wherein FIG. 1 is a flow chart of the method for voice acquisition according to a first embodiment of the present application; FIG. 2 is a flow chart of the method for voice acquisition according to a second embodiment of the present application; and FIG. 3 is a schematic view of a software interface according to one embodiment of the present application.

As shown in FIG. 1, the method for information interaction according to the first embodiment of the present application may comprise steps S1-S12:

In the step S1, the present application first displays a prompt word list, wherein the prompt word list comprises the characters corresponding to the first to fifth prompt words. Specifically, the present application can display a prompt word list at the lower part of a program interface, wherein the program list comprises five prompt words: do, re, mi, sol and la.

Next, in the step S2, the present application starts to display and persistently flash a first prompt word and starts to receive a first input voice of a user. Specifically, the present application displays the first prompt word, for example "do", in the middle of the program interface, and starts to receive the voice of the user at the lower part of the program interface, for example, a voice input button can be turned on, and a hardware driver, for example a microphone, bound or matched with the program can be accessed.

Further, in order to improve the voice recognition rate and accuracy rate of the user, a pinyin corresponding to the first prompt word, for example the pinyin "duo", can be displayed below the first prompt word.

Next, in the step S3, after the first input voice of the user is received, the present application compares the received first input voice with the first prompt word, and determines whether the first input voice is matched with the first prompt word. Specifically, the first input voice can be converted into waveform data; then the waveform data is compared with the waveform data corresponding to the first prompt word to determine whether the first input voice is matched with the first prompt word.

If the first input voice is not matched with the first prompt word, then the present application continues to execute the step S2: displaying the first prompt word and starting to receive the first input voice of the user.

If the first input voice is matched with the first prompt word, then the present application executes the step S4: displaying and persistently flashing a second prompt word and starting to receive a second input voice of the user. Specifically, the present application displays the second prompt word, for example "re", in the middle of the program interface, and starts to receive the voice of the user at the lower part of the program interface, for example, a voice input button can be turned on, and a hardware driver, for example a microphone, bound or matched with the program can be accessed.

Further, in order to improve the voice recognition rate and accuracy rate of the user, a pinyin corresponding to the second prompt word, for example the pinyin "lai", can be displayed below the second prompt word.

Next, in the step S5, after the second input voice of the user is received, the present application compares the second input voice with the second prompt word, and determines whether the second input voice is matched with the second prompt word. The specific comparison method is as described above in the step S3, and will not be described in detail herein.

If the second input voice is not matched with the second prompt word, then the present application continues to execute the step S4: displaying and persistently flashing the second prompt word and starting to receive the second input voice of the user.

If the second input voice is matched with the second prompt word, then the present application executes the step S6: displaying and persistently flashing a third prompt word and starting to receive a third input voice of the user. Specifically, the present application displays the third prompt word, for example "mi", in the middle of the program interface, and starts to receive the voice of the user at the lower part of the program interface. Further, a pinyin corresponding to the third prompt word, for example the pinyin "mi", can be displayed below the third prompt word.

Next, in the step S7, after the third input voice of the user is received, the present application compares the third input voice with the third prompt word, and determines whether the third input voice is matched with the third prompt word. If the third input voice is not matched with the third prompt word, then the present application continues to execute the step S6: displaying and persistently flashing the third prompt word and starting to receive the third input voice of the user.

If the third input voice is matched with the third prompt word, then the present application executes the step S8: displaying and persistently flashing a fourth prompt word and starting to receive a fourth input voice of the user. Specifically, the present application displays the fourth prompt word, for example "sol", in the middle of the program interface, and starts to receive the voice of the user at the lower part of the program interface. Further, a pinyin corresponding to the fourth prompt word, for example the pinyin "so", can be displayed below the fourth prompt word.

Next, in the step S9, after the fourth input voice of the user is received, the present application compares the fourth input voice with the fourth prompt word, and determines whether the fourth input voice is matched with the fourth prompt word. If the fourth input voice is not matched with the fourth prompt word, then the present application continues to execute the step S8: displaying and persistently flashing the fourth prompt word and starting to receive the fourth input voice of the user.

If the fourth input voice is matched with the fourth prompt word, then the present application executes the step S10: displaying and persistently flashing a fifth prompt word and starting to receive a fifth input voice of the user. Specifically, the present application displays the fifth prompt word, for example "la", in the middle of the program interface, and starts to receive the voice of the user at the lower part of the program interface. Further, a pinyin corresponding to the fifth prompt word, for example the pinyin "la", can be displayed below the fifth prompt word.

Next, in the step S11, after the fifth input voice of the user is received, the present application compares the fifth input voice with the fifth prompt word, and determines whether the fifth input voice is matched with the fifth prompt word. If the fifth input voice is not matched with the fifth prompt word, then the present application continues to execute the step S10: displaying and persistently flashing the fifth prompt word and starting to receive the fifth input voice of the user.

If the fifth input voice is matched with the fifth prompt word, then the present application executes the step S12: integrating the first input voice, the second input voice, the third input voice, the fourth input voice and the fifth input voice to be a digital voice file, and storing the digital voice file. Further, the first input voice, the second input voice, the third input voice, the fourth input voice and the fifth input voice can be integrated to be a WAV format file, and the file can be uploaded to a remote server for further processing.

In addition, in order to present the current progress and improve user experience, after one input voice is determined to be matched with one prompt word, the present application highlights the character corresponding to the prompt word in the prompt word list, for example, after the input voice "do" is determined, the corresponding prompt word "do" at the lower part of the program interface is highlighted, or displayed in a display manner different from other prompt words.

As shown in FIG. 2, the method for voice acquisition according to the second embodiment of the present application may comprise steps S21-S24:

In the step S21, the present application sequentially displays and persistently flashes first to fifth prompt words, and starts to receive first to fifth input voices of a user, for example, the five prompt words are respectively do, re, mi, sol and la.

In the step S22, after the first to fifth input voices of the user are received, the present application respectively compares the first to fifth input voices with the first to fifth prompt words.

In the step S23, if the first to fifth input voices are matched with the first to fifth prompt words, then storing the input voices matched with the prompt words.

Finally, in the step S24, the present application integrates the input voices matched with the prompt words to be a digital voice file, and uploads the digital voice file.

In addition, the present application further relates to a device for information interaction, the device comprising: a display module, for sequentially displaying and persistently flashing first to fifth prompt words and starting to receive first to fifth input voices of a user; a comparison module, for respectively comparing the first to fifth input voices with the first to fifth prompt words after the first to fifth input voices of the user are received; a storage module, for storing the input voices matched with the prompt words if the first to fifth input voices are matched with the first to fifth prompt words; and an information processing module, for integrating the input voices matched with the prompt words to be a digital voice file, and uploading the digital voice file.

In addition, the present application further relates to a hand held mobile terminal; the mobile terminal includes but not limited to a tablet computer, a notebook, a mobile desktop computer and a mobile phone; the mobile terminal comprises a memory, a processor and a program stored in the memory and capable of running on the processor, wherein when the process executes the program, any one step of the method for information interaction as described above can be realized.

The computer program involved in the present application can be stored in a computer readable storage medium; the computer readable storage medium may comprise: any physical device capable of carrying a computer program code, a virtual device, a U-disk, a mobile hard disk, a magnetic disk, a compact disk, a computer memory, a read-only memory (ROM), a random access memory (RAM), an electrical carrier signal, a telecommunication signal, and other software distribution mediums.

Embodiment

The software interface of the present application is as shown in FIG. 3; the user can initiate a recognition request through the interaction of the interface; furthermore, in the present application, a voice recording device can be turned on to prepare for voice recording. The prompt word "do" is first displayed and flashes on a screen; after the user reads the word, the prompt word on the screen changes to "re" and flashes; after the user reads the word, the prompt word changes to "mi" and flashes; after the user reads the word, the prompt word changes to "sol" and flashes; after the user reads the word, the prompt word on the screen changes to "la"; after the user reads the word, the prompt word disappears. The recorded voices above are integrated to be a system available digital voice file, and the digital voice file is uploaded to a remote server for further processing.

Obviously, a person skilled in the art should understand that the above-described modules or steps of the present invention can be realized via a common computing device, and can be integrated on a single computing device or distributed on a network consisting of a plurality of computing devices; alternatively, the modules and the steps can be realized in the forms of computing device executable program codes; therefore, the modules and the steps can be stored in a storage device, and executed by a computing device, or can be respectively made into integrated circuit modules; alternatively, a plurality of the modules or steps therein can be made into a single integrated circuit module. Therefore, the present invention is not limited to any specific hardware and software combinations.

The descriptions above are only preferred embodiments of the present application, but not intended to limit the present application. For a person skilled in the art, the present application may have various changes and variations. Any modifications, equivalent substitutions, improvements and the like within the spirit and principles of the present application shall be concluded in the protection scope of the present application.

What is claimed is:

1. A method for information interaction, comprising:
   displaying and persistently flashing a first prompt word and starting to receive a first input voice of a user;
   after the first input voice of the user is received, comparing the first input voice with the first prompt word;
   if the first input voice is matched with the first prompt word, then storing the first input voice, displaying and persistently flashing a second prompt word and starting to receive a second input voice of the user;
   after the second input voice of the user is received, comparing the second input voice with the second prompt word; and
   if the second input voice is matched with the second prompt word, then displaying and persistently flashing a third prompt word and starting to receive a third input voice of the user;
   after the third input voice of the user is received, comparing the third input voice with the third prompt word;
   if the third input voice is matched with the third prompt word, then displaying and persistently flashing a fourth prompt word and starting to receive a fourth input voice of the user;
   after the fourth input voice of the user is received, comparing the fourth input voice with the fourth prompt word;
   if the fourth input voice is matched with the fourth prompt word, then displaying and persistently flashing a fifth prompt word and starting to receive a fifth input voice of the user;
   after the fifth input voice of the user is received, comparing the fifth input voice with the fifth prompt word; and
   if the fifth input voice is matched with the fifth prompt word, then integrating the first input voice, the second input voice, the third input voice, the fourth input voice and the fifth input voice to be a digital voice file, and storing the digital voice file;
   wherein the first prompt word is "do"; the second prompt word is "re"; the third prompt word is "mi"; the fourth prompt word is "sol"; and the fifth prompt word is "la".

2. The method for information interaction according to claim 1, wherein if the first input voice is not matched with the first prompt word, then the method continues to display and persistently flash the first prompt word and starts to receive the first input voice of the user; and
   if the second input voice is not matched with the second prompt word, then the method continues to display and persistently flash the second prompt word and starts to receive the second input voice of the user.

3. The method for information interaction according to claim 1, wherein before the step of integrating the first input voice and the second input voice to be a digital voice file, the method further comprises:
   displaying and persistently flashing a third prompt word and starting to receive a third input voice of the user;
   after the third input voice of the user is received, comparing the third input voice with the third prompt word;
   if the third input voice is matched with the third prompt word, then displaying and persistently flashing a fourth prompt word and starting to receive a fourth input voice of the user;
   after the fourth input voice of the user is received, comparing the fourth input voice with the fourth prompt word;
   if the fourth input voice is matched with the fourth prompt word, then displaying and persistently flashing a fifth prompt word and starting to receive a fifth input voice of the user;
   after the fifth input voice of the user is received, comparing the fifth input voice with the fifth prompt word; and
   if the fifth input voice is matched with the fifth prompt word, then integrating the first input voice, the second input voice, the third input voice, the fourth input voice and the fifth input voice to be a digital voice file, and storing the digital voice file.

4. The method for information interaction according to claim 3, wherein when each prompt word is displayed, a pinyin corresponding to the prompt word is also displayed below the prompt word.

5. The method for information interaction according to claim 3, wherein before the step of displaying and persistently flashing a first prompt word and starting to receive a first input voice of a user, the method further comprises:
   displaying a prompt word list, wherein the prompt word list comprises the characters corresponding to the first to fifth prompt words.

6. The method for information interaction according to claim 5, wherein after one input voice is determined to be matched with one prompt word, the character corresponding to the prompt word is highlighted in the prompt word list.

7. A method for information interaction, comprising:
   sequentially displaying and persistently flashing first to fifth prompt words and starting to receive first to fifth input voices of a user;
   after the first to fifth input voices of the user are received, respectively comparing the first to fifth input voices with the first to fifth prompt words;
   if the first to fifth input voices are matched with the first to fifth prompt words, then storing the input voices matched with the prompt words; and
   integrating the input voices matched with the prompt words to be a digital voice file, and uploading the digital voice file;
   wherein the first prompt word is "do"; the second prompt word is "re"; the third prompt word is "mi"; the fourth prompt word is "sol"; and the fifth prompt word is "la".

8. A device for information interaction, comprising:
   a display module, for sequentially displaying and persistently flashing first to fifth prompt words and starting to receive first to fifth input voices of a user;

a comparison module, for respectively comparing the first to fifth input voices with the first to fifth prompt words after the first to fifth input voices of the user are received;

a storage module, for storing the input voices matched with the prompt words if the first to fifth input voices are matched with the first to fifth prompt words; and an information processing module, for integrating the input voices matched with the prompt words to be a digital voice file, and uploading the digital voice file;

wherein the first prompt word is "do"; the second prompt word is "re"; the third prompt word is "mi"; the fourth prompt word is "sol"; and the fifth prompt word is "la".

9. A mobile device, comprising a memory, a processor and a program stored in the memory and capable of running on the processor, wherein when the process executes the program, the steps of the method for information interaction as claimed in claim 1 are realized.

* * * * *